July 10, 1923.

J. W. ORR 1,461,401

EMERGENCY BRAKE

Filed Oct. 20, 1921

Inventor
J. W. Orr.

By
Lacey & Lacey, Attorneys

July 10, 1923.
J. W. ORR
EMERGENCY BRAKE
Filed Oct. 20, 1921
1,461,401
2 Sheets-Sheet 2
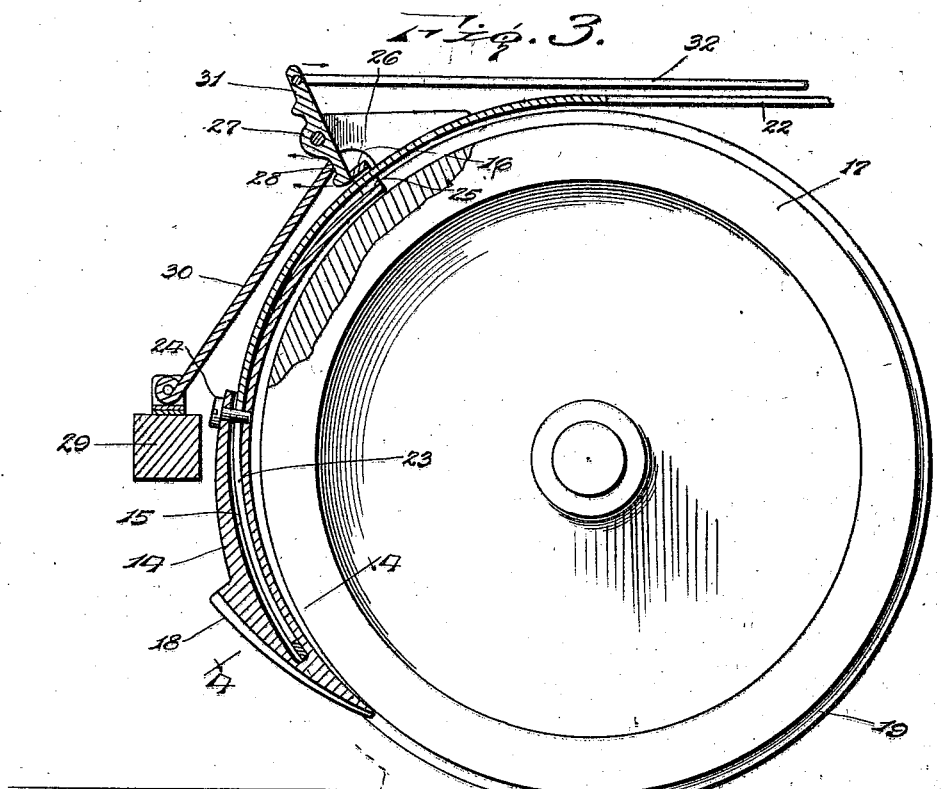
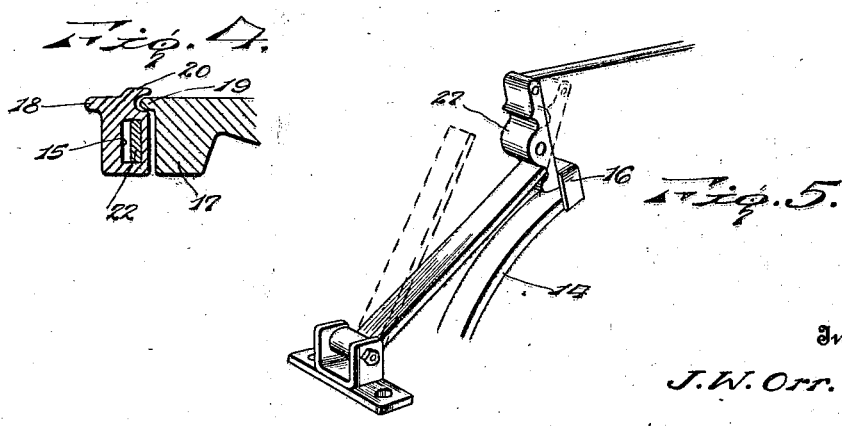
Inventor
J. W. Orr.
By Lacey & Lacey, Attorney Patented July 10, 1923.

1,461,401

UNITED STATES PATENT OFFICE.

JAMES W. ORR, OF KANSAS CITY, MISSOURI.

EMERGENCY BRAKE.

Application filed October 20, 1921. Serial No. 508,918.

*To all whom it may concern:*

Be it known that I, JAMES W. ORR, a citizen of the United States, residing at Kansas City, in the county of Jackson and State of Missouri, have invented certain new and useful Improvements in Emergency Brakes, of which the following is a specification.

My invention relates to emergency brakes for street cars or railroad cars but it may also, with advantage, be adapted to other vehicles.

One object of the invention is to provide a brake of this class in addition to the ordinary air and hand brakes usually on street cars and which are operated by the motorman, this emergency brake being entirely independent of the other brakes and intended to be operated by the conductor instead of by the motorman.

One advantage of this invention is that this brake will put no extra strain on the wheels, nor wear them flat, as other brakes do, because this brake is constructed as a skid or wedge inserted between the wheel and the rail when in operation.

In the accompanying drawings, in which one embodiment of the invention is illustrated:

Figure 1 shows a street car in side elevation, with the emergency brake attached, Figure 2 is a perspective view of the brake showing the relative positions of the wheel and the brake when not in operation, Figure 3 is a side elevation, on a larger scale, partly in section, of a wheel with the brake raised, Figure 4 is a section of a portion of a wheel and the skid along line 4—4 of Figure 3, and Figure 5 is a perspective view of a portion of the brake.

A street car 10, provided with two four-wheel trucks 11, is shown in Figure 1 of the drawings, the left side of the figure denoting the front end of the car with the emergency brake 12 in position over the front wheels of the forward truck.

The brake consists of a wedge-shaped skid 13 having an upward extension 14 provided with a chamber or pocket 15 which runs some distance down into the skid proper. The upper extremity of the extension 14 is provided with a lug 16 and the inner contour of the extension and the skid conforms to the contour of the wheel rim 17. The wedge portion of the skid has a flange 18 similar to the flange 19 on the wheel rim and a curved lip 20 engaging over the wheel flange 19 for the purpose of preventing any side motion between the skid and wheel, the flange 18 on the skid engaging with the rail in the same manner as the flange 19 on the wheel, to keep both skid and wheel on the track.

One of the cross beams 21 of the truck 11 has rigidly attached thereto a guide strip 22 preferably made of flat steel or iron and extending forwardly above the front wheel, and having its forward end curved to conform therewith and with the extension 14 of the skid. The free end of this guide engages in the pocket or chamber 15 formed in the skid and is constructed to provide a limited sliding motion of the skid upon the guide. For this purpose, I provide a longitudinal slot 23 in the lower end of the guide, in which slot engages a stop screw 24 inserted in the middle part of the skid 13. Instead of this arrangement, any other suitable device may be provided for limiting the sliding movement of the skid. The lug 16 has an opening 25 into which the guide fits.

On the upper part of the guide 22 is provided a bearing 26 for a dog 27 which is hinged thereon. This dog has a recessed portion 28 at its lower end, which end is constructed to extend into the path of the lug 16 so as to engage with its rear face the front side of the lug 16 when the skid is in raised position.

In front of the wheel, and hinged to the cross beam 29, is provided a strut 30 extending upwardly above the skid and engaging with the recess 28 in the dog 27 so as to hold the dog rigidly against the lug 16 on the skid and thereby lock the parts together. The dog has an arm 31 reaching upward and on which a connecting rod 32 is journaled. The other end of the connecting rod 32 is linked to the short arm 33 of a cross bar 34 carried in suitable bearings 35 secured on the beam 21. Secured to this cross bar 34, or made integral therewith, is a lever 36, to the end of which a rope 37 is fastened. This rope 37 is guided over suitable rollers or pulleys 38 and carried up under the ceiling of the car and back to the rear platform, terminating in a handle 39 in a suitable position to be conveniently reached by the conductor standing on the rear platform. A handle 40 may also be provided on the cross bar 34.

The operation of the device is as follows:

If, for some reason, the motorman cannot operate the usual air or hand brakes in the front end of the car, or if it is found to be necessary to stop the car suddenly by reason of some obstruction observed by the conductor and not seen by the motorman, the conductor may operate the emergency brake by pulling on the handle 39, which then trips the dog 27 and the strut 30, thereby releasing the skid, which, partly by its own weight, and partly by the drag of the wheel thereon, will draw the skid down until it takes the position shown in dot and dash lines in Figure 3, between the rail and the wheel. The wheel will then be slightly raised from the rail and all the wear and sliding will take place between the rail and the skid, and the friction set up in this manner will soon stop the car without causing any wear or undue strain on the wheels.

In resetting the skid, the handle 40 may be used to swing the dog in contact with the lug 16, after the skid has been slid up on the guide 22 until the lug 25 strikes against the bearing 26. Finally, the strut 30 is pressed down into the recess 28 on the dog, and the parts are then again locked together and the skid held sufficiently away from the wheel rim so as to cause no friction between them. It will be evident that, instead of operating the emergency brake from the rear platform, it may be equally well operated from the front platform, by the motorman, or provision may be made for operating the brake from both platforms. It will also be evident that not only the front wheels of the forward truck may be provided with emergency brakes of this character, but that also the rear wheels may have similar brakes, or all four wheels on both trucks. In that case, all the brakes might be constructed to work in conjunction or each brake separately.

Having thus described the invention, what is claimed as new is:

1. In an emergency brake for vehicles, the combination with a truck having wheels; of a wedge-shaped skid having an upward extension provided with a pocket, a guide member rigidly attached at one end of said truck, the free end of said member engaging in said pocket and being adapted to permit a limited movement of said skid thereon, an abutment at the end of said extension, a strut having hinged connection with said truck, a dog journaled on said guide member and adapted to form a lock between said abutment and the free end of said strut and means for releasing the skid.

2. In an emergency brake for vehicles, the combination with a truck having wheels; of a wedge-shaped skid having an upward extension provided with a pocket, a guide member rigidly attached at one end of said truck, the free end of said member engaging in said pocket and being adapted to permit the limited movement of said skid thereon, an abutment at an end of said extension, a strut having hinged connection with said truck, a dog journaled on said guide member and adapted to form a lock between said abutment and the free end of said strut and means for tripping said dog.

3. In an emergency brake for vehicles, the combination with a truck having wheels; of a wedge-shaped skid having an upward extension provided with a pocket, a guide member rigidly attached at one end to said truck, the free end of said member engaging in said pocket and being adapted to permit a limited movement of said skid thereon, an abutment at the end of said extension, a strut having hinged connection with said truck, a dog journaled on said guide member and adapted to form a lock between said abutment and the free end of said strut, operating means on said truck, and suitable link connection between said means and said dog for tripping the dog and releasing the skid.

In testimony whereof I affix my signature.

JAMES W. ORR. [L. S.]